No. 11,846. Reissued Aug. 14, 1900.
F. H. GILSON.
SEPARABLE BOOK.
(Application filed June 28, 1898.)
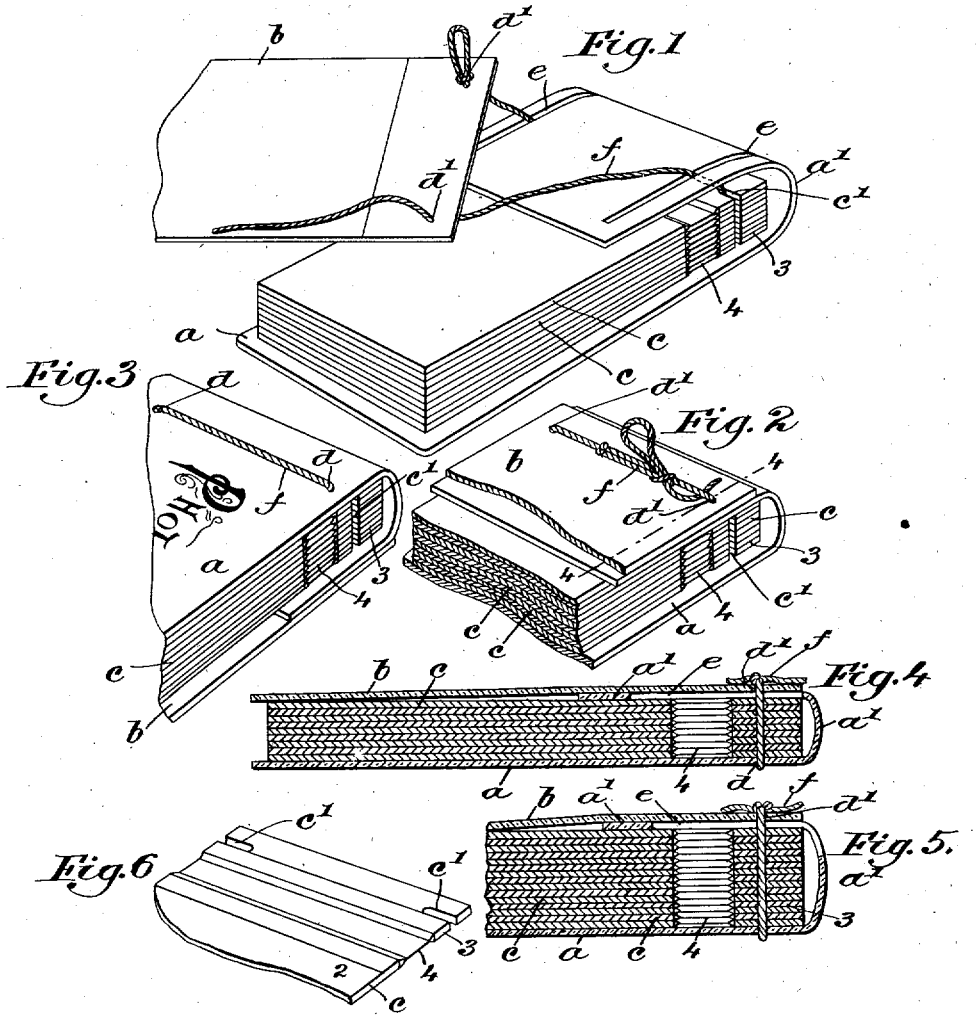
Witnesses:
A. D. Harrison
P. W. Pizzetti
Inventor:
F. H. Gilson
by Wright, Brown & Quinby
Attys.

UNITED STATES PATENT OFFICE.

FRANKLIN H. GILSON, OF WELLESLEY, MASSACHUSETTS, ASSIGNOR TO THE F. H. GILSON COMPANY, OF BOSTON, MASSACHUSETTS.

SEPARABLE BOOK.

SPECIFICATION forming part of Reissued Letters Patent No. 11,846, dated August 14, 1900.

Original No. 584,997, dated June 22, 1897. Application for reissue filed June 28, 1898. Serial No. 684,700.

*To all whom it may concern:*

Be it known that I, FRANKLIN H. GILSON, of Wellesley, in the county of Norfolk and State of Massachusetts, have invented certain new and useful Improvements in Separable Books, of which the following is a specification.

This invention relates to an album or other book comprising a series of leaves and a cover separably connected thereto.

The invention has for its object to provide an improved construction of the leaves and cover of an article of this character, whereby the same may be readily assembled and separated and a collection of any desired number of leaves may be used with the same cover, the cover being extensible, so as to fit a collection of leaves of any desired thickness.

The invention also has for its object to provide an improved detachable cover or temporary binder for other purposes, such as holding sheets or cards having samples of cloth and other materials.

The invention consists in the improvements which I will now proceed to describe and claim.

Of the accompanying drawings, forming a part of this specification, Figure 1 represents a perspective view of my improved album, showing the back lid partially removed. Fig. 2 represents a perspective view of a portion of the album, showing the back lid in place. Fig. 3 represents a perspective view of a portion of the album, the front lid being uppermost. Fig. 4 represents a section on line 4 4 of Fig. 2. Fig. 5 represents a section similar to Fig. 4, showing a greater number of leaves. Fig. 6 represents a perspective view of a portion of one of the leaves.

In the drawings, *a* represents the front lid, and *b* the back lid, of my improved album-cover. These parts may be of any suitable construction and made of any suitable material.

*c c* represent a series of leaves which are interposed between the lids *a* and *b* and are connected thereto by the means hereinafter described.

The front lid *a* is provided with a flexible extension *a'*, formed to extend over the back of the series of leaves *c* and to project between the last leaf of the series and the back lid *b*.

The front lid *a* is provided near its inner end with orifices *d d*, while the back lid *b* is provided near its inner end with corresponding orifices *d' d'*, which are arranged to coincide with the orifices *d d* when the lids are in place at opposite sides of the series of leaves.

The extension *a'* is provided with longitudinal slots *e e*, which are arranged to coincide with the orifices *d d d' d'*, so that a cord *f* may pass directly from each orifice *d* to the corresponding orifice *d'* through a slot *e*.

Each leaf *c* has near its inner end a slot *c'*, said slots extending inwardly in opposite directions from the top and bottom edges of the leaves. The slots *c'* are arranged so that their inner ends coincide with the orifices *d d d' d'* when the several parts are assembled. I prefer to make each leaf of a main portion 2, of acomparatively stiff and heavy cardboard, an end portion 3, of similar material, composing the inner end of the leaf, and a thinner flexible portion 4, preferably made of one or more layers of cloth, connecting the portions 2 and 3.

In assembling the above-described parts I place the series of leaves on the cover *a*, fold the extension *a'* over upon the series of leaves, as indicated in Fig. 1, and pass the cord *f* first through one of the orifices *d'* in the back lid, the corresponding slots *e* and *c'*, and the corresponding orifice *d* in the cover *a*, then along the outer side of the cover *a*, as indicated in Fig. 3, through the other orifice *d*, the slots *c'* in the opposite edges of the leaves the other slot *e* in the extension *a'*, and the other orifice *d'* in the back lid *b*, after which I tie together the free ends of the cord on the back cover *b*, as indicated in Fig. 2.

It will be seen by reference to Figs. 4 and 5 that the slots *e* in the back extension *a'* enable the cord *f* to pass through said back extension at various points, so that the cover can be accommodated to any desired number of leaves *c*, the number shown in Fig. 5 being considerably greater than that shown in Fig. 4. It will also be seen that the slots *c'* in the leaves *c* enable the leaves to be readily inserted and removed from any part of the pack by loosening the cord and slipping it out of slots *c'*.

I am aware that it is not new to provide slots in the leaves of an album or book and to secure the same by cords, and I do not therefore claim this feature broadly. I am also aware that a cover composed of a front and a back lid, one having a flexible extension to serve as the back of the cover, so that the same cover can be used with an interposed pack of leaves of any desired thickness, is not broadly new. I am the first, however, so far as I am aware, to provide the two lids with coinciding orifices and the back extension with longitudinal slots intersecting said orifices and to employ a cover of this construction with a series of slotted leaves.

My invention is not limited to photograph-albums, but may be embodied in a separable book of any other nature, such as a sample-book for holding samples of cloth and other merchandise.

I claim—

1. A book or album cover, comprising two solid lids, which are unattached and disconnected, one of them being extended at its inner end to form a back, and means completely surrounding portions of said lids and extension for binding said lids together.

2. A book or album cover comprising two unattached and disconnected lids, one lid having a part or extension forming a back and lying loosely under the inner edge of the other lid, and a binding device completely surrounding portions of said lids and extension for detachably connecting the two lids together.

3. A book or album cover comprising two unattached and disconnected lids, of which, one has a flexible extension forming a back and lying loosely under the inner edge of the other, and a flexible binding device passed through openings in said lids and completely surrounding portions of said lids and extension for binding them together.

4. A book or album cover comprising two unattached and disconnected lids, of which one has a flexible extension forming a back and lying loosely under the inner edge of the other lid, said extension and said lids having openings, and binding devices passing through said openings and completely surrounding portions of said lids and extension for connecting said lids together.

5. A book or album cover comprising a front lid provided with orifices near its inner end; a flexible extension or back formed thereon, and provided with longitudinal slots arranged to register with said orifices; and a back lid having orifices near its inner end arranged to register with the said slots and first-mentioned orifices, said slots and orifices being arranged to receive a cord or lacing, whereby the lids may be connected with each other and with a series of leaves interposed between the lids, the slots permitting said cord to pass through the flexible extension at various points, as set forth.

6. A book of the character specified, comprising two separable lids, each having orifices near its inner end; a flexible extension or back formed on one of said lids and provided with longitudinal slots arranged to register with the orifices in the lids; a series of independent leaves interposed between the lids, and having slots extending inwardly from their edges near their inner ends, the inner ends of said slots coinciding with the orifices in the lids; and a lacing-cord connecting said lids and leaves, the said cord passing through the orifices of the lids, the slots of the back extension, and the slots of the leaves.

7. A book or album comprising a number of independent leaves each consisting of a main part upon which the photograph is mounted, a narrow binding part or end having short, narrow notches or recesses opening from the top and bottom edges and extending parallel with the rear edge and a wide flexible hinge connecting the two parts of the leaf, and a front and back lid adapted to be connected by a flap which forms an extensible back and is integral with one of the lids, and detachable means uniting the two lids and the separate leaves together consisting of flexible cords seated at the inner end of the said open notches passing through slots in line with the ends of said notches in the back flap and attached to the lids in line with the ends of said notches.

In testimony whereof I have affixed my signature in the presence of two subscribing witnesses.

FRANKLIN H. GILSON.

Witnesses:
MARCUS B. MAY,
P. W. PEZZETTI.